Figure 6:
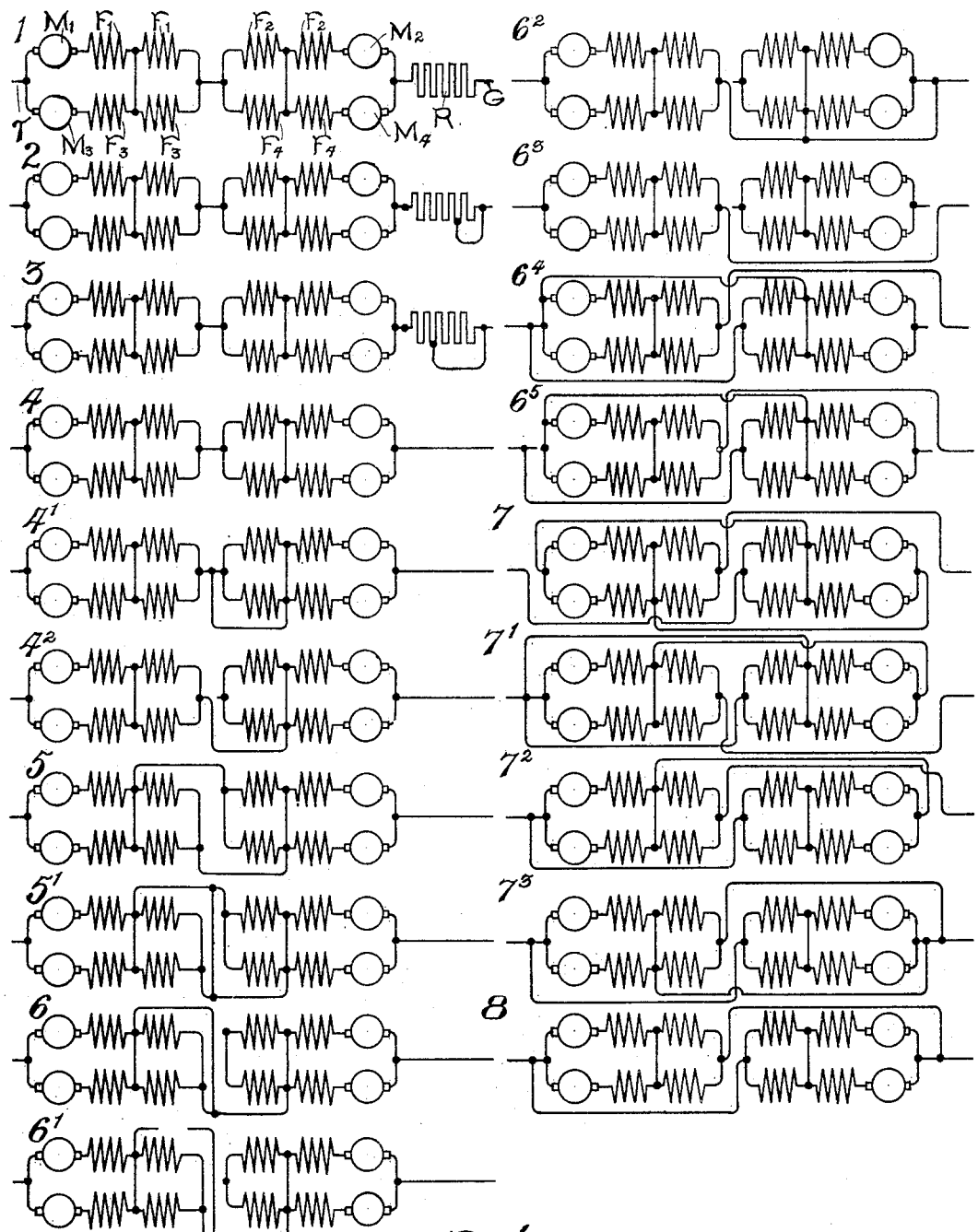

No. 749,271. PATENTED JAN. 12, 1904.
S. T. DODD.
ELECTRIC MOTOR CONTROL.
APPLICATION FILED JUNE 4, 1903.
NO MODEL. 3 SHEETS—SHEET 1.
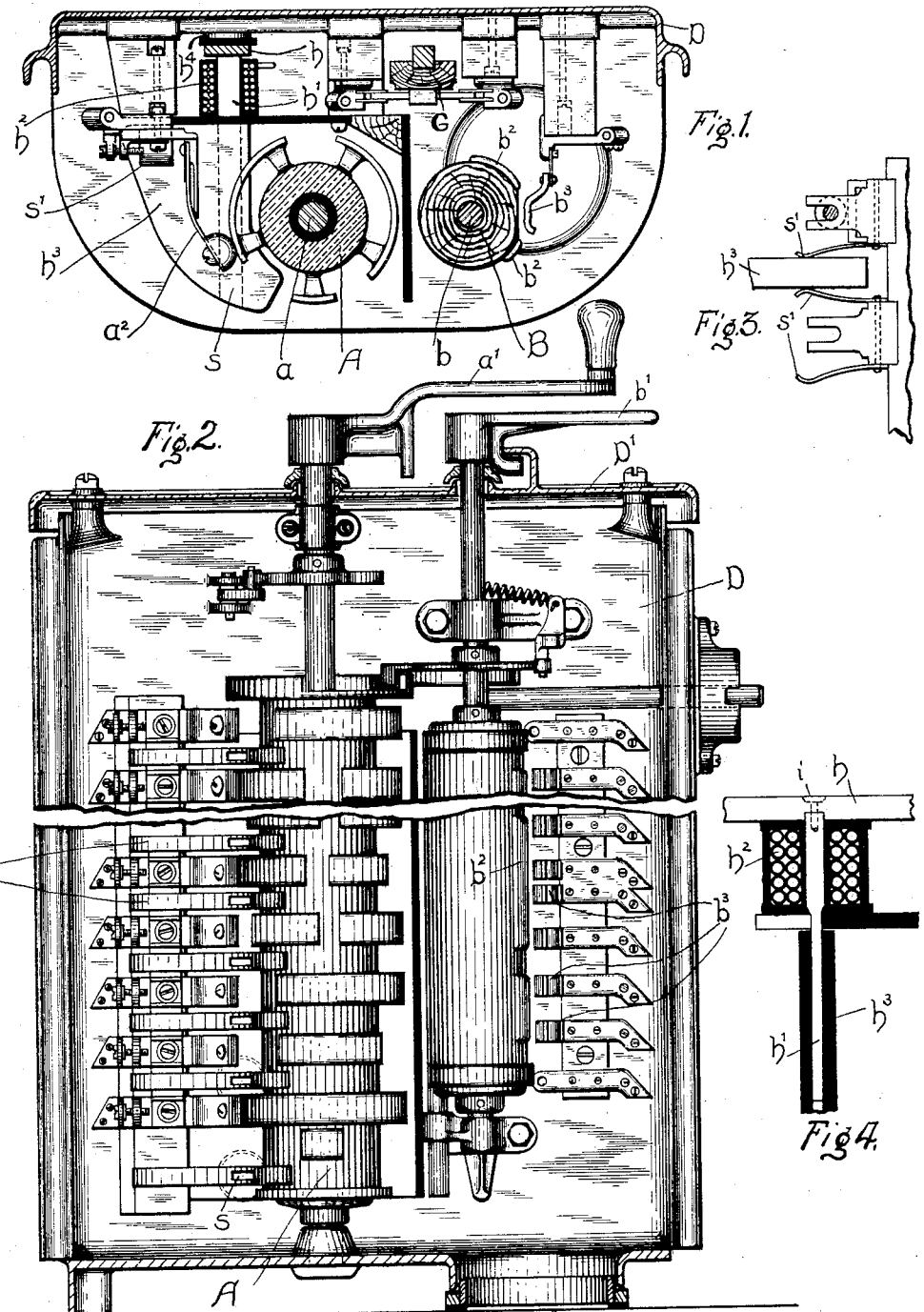

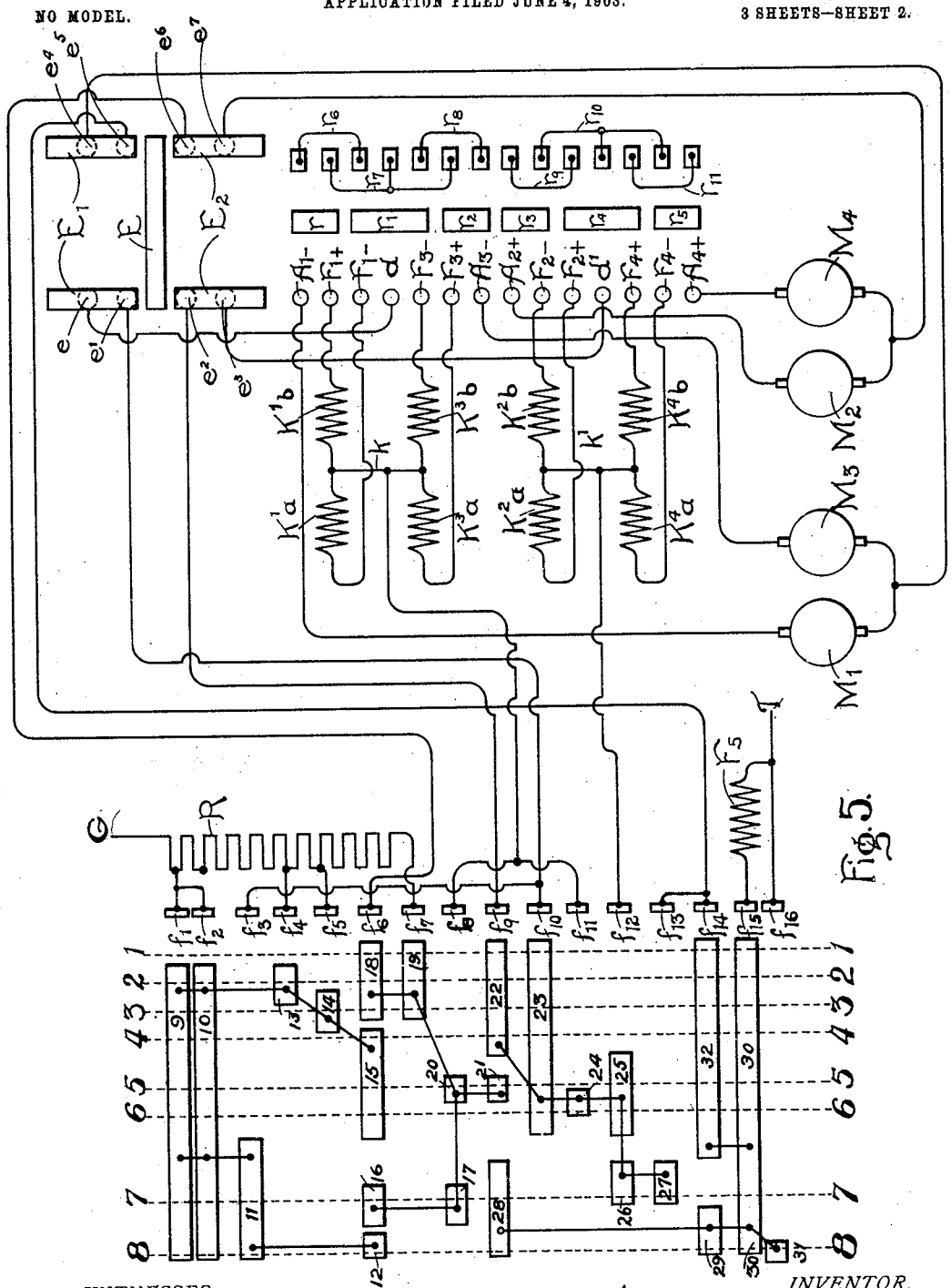

No. 749,271. PATENTED JAN. 12, 1904.
S. T. DODD.
ELECTRIC MOTOR CONTROL.
APPLICATION FILED JUNE 4, 1903.
NO MODEL. 3 SHEETS—SHEET 3.

WITNESSES:
INVENTOR.
Samuel T. Dodd
BY Richard Tyr
ATTORNEY.

No. 749,271.

Patented January 12, 1904.

UNITED STATES PATENT OFFICE.

SAMUEL T. DODD, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

ELECTRIC-MOTOR CONTROL.

SPECIFICATION forming part of Letters Patent No. 749,271, dated January 12, 1904.

Application filed June 4, 1903. Serial No. 160,043. (No model.)

*To all whom it may concern:*

Be it known that I, SAMUEL T. DODD, a citizen of the United States, and a resident of Pittsfield, Massachusetts, have invented certain new and useful Improvements in Electric-Motor Control, of which the following is a specification.

My invention relates to electric controllers, and more especially to that type of controller ordinarily used for regulating electric-railway motors, although in many ways my invention is not limited to use with this particular type of controller.

The object of my invention is to provide an efficient controller employing a novel method of controlling the speed and acceleration of the motors with a minimum use of external resistance and yet with maximum safety to the motors and with as little as possible complication of circuits, and also to provide a controller adapted either for the control of two motors or four motors employing such a method, and also to provide a controller having in every possible way the number of contacts on the different switches cut down to the smallest possible number and having the parts so arranged that the controller as a whole will occupy as little space as possible. I believe that a controller built in accordance with my invention is much smaller than any four-motor controller that has hitherto been constructed, and this is due both to the circuit arrangements of the same, to the arrangement and form of the different switches employed therein, and to the arrangement and construction of the magnetic blow-out employed in the controller.

Another object of my invention is to provide a magnetic blow-out which will be more economical in employment of current than the blow-outs hitherto used and at the same time will be extremely simple and compact and arranged to blow the arcs in the direction that will not tend to form an arc between two fixed parts of the controller. Hitherto the most efficient forms of blow-out magnet in actual use have blown the arcs vertically, and thereby tended to form an arc between two adjacent fixed fingers of the controller, and this even though the fingers were separated by insulating septa.

Another object of my invention is to provide suitable means for supporting insulating septa to separate the contact-fingers of the controller and also to protect the pole-pieces of the magnetic blow-out in such a way that though readily fixed in position they can be with equal readiness removed therefrom independently in order that the fingers or other parts may be inspected or repaired.

I attain these various objects by the construction, arrangement, and combination of parts illustrated in the drawings attached hereto and described hereinafter, in the course of which description I will point out the various features of construction by which I obtained the before-mentioned objects and other more specific advantages.

Referring to the drawings, Figure 1 is a cross-section taken through a controller embodying my invention, and Fig. 2 is a front elevation of the same with the door removed and with the central portion of the controller broken away. Fig. 3 is a detail view representing the spring-clips engaging the insulating septa. Fig. 4 is a side view, partly in section, of a portion of the blow-out magnet. Fig. 5 is a diagram showing the contacts of the various switches and the electrical devices to which they are connected. Fig. 6 is a diagram representing the various changes made in the circuit by the movement of the controlling-switch.

Referring to Figs. 1 and 2, which show the general assembly of the various parts of the controller, $a$ and $b$ are the shafts, respectively, of the controlling and reversing switches, which are mounted in suitable bearings carried by the casing D and which project upwardly through the top D' of the casing and are operated by handles $a'$ and $b'$, respectively. A is the controller-drum, composed of a plurality of contact-segments, the same being suitably insulated from the shaft $a$ in any well-known manner. B is the drum of the reversing-switch, carrying contacts $b^2$ and engaged by fingers $b^3$. The fingers engaging the drum of the controller-switch are lettered $a^2$. In Fig. 5, where the connections of all these fingers are shown, each finger is given a separate reference-letter.

G represents a switch for cutting out either of the motors, as desired, in case one of the motors is disabled. The switch here illustrated, though of novel type, I do not claim, since it is the invention of F. V. Nicholls and forms the subject-matter of an application to be filed by him. For the purpose of describing my invention no description of this switch is necessary, since cut-out switches are old in the art, and a switch of any well-known type may be used with my controller. These remarks also apply to the particular form of interlocking device illustrated at I.

The blow-out is illustrated in Fig. 1 at H, comprising a vertical bar $h$, from which project a series of horizontal bars $h'$, energized by coils $h^2$. The pole ends of bars $h'$ extend between contact-fingers $a^2$ and carry the insulating-septa $h^3$. This blow-out magnet will be described more fully hereinafter.

Turning now to Fig. 5, which shows the circuit connections of the different switches of the controller as well as the arrangement of contacts of each switch, I will explain the method of control which I employ and show how the various switches perform their allotted functions. The controlling-switch shown at the left of the figure comprises the sixteen contact-fingers $f'$ to $f^{16}$ and four groups of contacts 9 to 15, 16 to 21, 22 to 27, and 28 to 32. The said four groups of contacts are thus carried by the controller-drum and are movable to make contact with the fingers $f'$ to $f^{16}$. $F^5$ represents the winding of the blow-out magnet. R represents an external resistance. $M'$ to $M^4$ represent the armatures of the four motors, and $K'^a$ $K'^b$ $K^{2a}$ $K^{2b}$ $K^{3a}$ $K^{3b}$ $K^{4a}$ $K^{4b}$ represent the field-windings of the motors, the winding of each motor being divided, as shown, into two parts, as $K'^a$ $K'^b$, each of said parts comprising half of the field-winding.

$r$ to $r^{11}$ indicate contacts of the reversing-switch carried on the drum B, and $A'^-$ $F'^+$ $F'^-$, &c., represent the fourteen contact-fingers of the reversing-switch.

$EE'$ and $EE^2$ are the movable contacts of the cut-out switch G, and $e$ to $e^7$ are the fixed contacts thereof.

For the purpose of explaining the method of control employed by the movement of the controlling-switch the cut-out and reversing switches may be considered as closed, the former at the position shown, with contact E out of engagement with any of the fixed contacts and contacts $E'$ and $E^2$ engaging the fixed contacts to connect them in pairs, as shown, while the reversing-switch may be considered as closed with contacts $r$ to $r^5$ in engagement with the fixed contacts of the switch.

The general scheme of control is to maintain the motors in two sets, there being two motors in each set in parallel with each other and the two sets being started in series with each other, preferably with an ordinary rheostat, and the two sets being afterward changed to parallel relation without at any time opening the main circuit, by successive changes in which the connections to mid-points in the fields of the different motors are shifted to different parts of the circuit, so as to make different combinations of such half-fields and the remaining parts of the motors. Thus, continuing the general description as of two motors, the motors are started in series, then a higher speed is obtained by placing half of one field in parallel with half of the other field without disturbing the series connection of the remaining coils of the motors. Then a still further speed is obtained by short-circuiting half the field-coil of each motor, and then a still further speed connection is obtained by placing the armatures and half of the fields of each of the motors in parallel while maintaining half of the field of each motor in series. Finally the motors are placed in full parallel. This gives a gradual acceleration, and at the same time there are no positions at which the motors can deleteriously buck each other, because there is always a substantial resistance in the path of each armature and each armature is always in circuit with half, at least, of its own field. In order to effectively employ this method of control for four motors without increasing the controlling apparatus to too large an extent, I permanently couple the motors of each set together at points midway their field-windings. I also connect the terminals of the two motors of each set together permanently so far as regards the controlling-switch, so that I am thus enabled to lead to the controlling-switch only three leads from each pair of motors, and thus have no more contacts than if only a pair of motors were to be controlled.

Another means which I employ to reduce the contacts that are necessary for controlling consists in so arranging the motor elements in the circuit and so shifting the connections that the circuit between the field and armature of each motor is never ruptured. To this end I place one pair of elements—say the armatures—at the extreme ends of the motor-ciruit, and the other elements—say the fields—at intermediate points in the motor-circuit. This groups the fields of both sets of motors together and enables me to make series multiple and other changes of such fields without disturbing the field connections between fields and armatures, as has hitherto been necessary in every controller which was based upon changes in the relations of the individual elements of the motors with respect to each other for speed regulation additional to the series and multiple positions.

With this general statement of the means I employ to control the motors and the advantages of such means the details of the control system, as shown by Fig. 5, and its results, as shown by Fig. 6, will be readily understood. Suppose the drum of the controller is in such a position that the controller at dotted line 1 engages the contact-fingers $f'$ to $f^{16}$. Under these circumstances the current enters at T, which represents the trolley connection, passes through blow-out coil F to finger $f^{15}$, thence through contacts 30 and 32 to finger $f^{14}$, through contacts $e^5$ and $e^4$ of the cut-out switch to armatures M' and M³. Thence through the contacts of the reversing-switch A' and A³ the current passes in multiple through the reversing-switch and through the two field-coils K' and K³, leaving the reversing-switch at finger $d$ and again passing through the cut-out switch and reaching the controlling-switch at finger $f^{10}$, thence by contacts 23 and 22 and finger $f^9$ through the cut-out switch to finger $d'$ of the reversing-switch, where the current divides between field-coils K² and K⁴, and out of the reversing-switch at fingers A³ and A⁴, through armatures M² and M⁴, thence through the cut-out switch to finger $f^6$, contacts 18 and 19, finger $f^7$, and through the resistance R to the ground G, thus putting the two sets of motors in series with each other and in series with the whole of the external resistance, as shown simply in position 1 of Fig. 8.

Having thus traced out one step, it will not be necessary to trace out each step in detail, as the results are clearly shown in Fig. 6, the running positions of the controller being indicated by the numerals 1, 2, 3, 4, 5, 6, 7, and 8, and the transitory positions occurring momentarily at change of connections being indicated by positions 4' 4², &c. Positions 2, 3, and 4 only vary from position 1 by the gradual reduction of the external resistance caused by the successive engagement of contacts 13, 14, 9, and 10 with fingers $f^4$ $f^5$ and $f'$ and $f^2$. At position 5 the mid-field connections $k$ and $k'$ come into play. Connection $k$ is connected to finger $f^8$ and $f^{11}$. Connection $k'$ is connected to finger $f^{12}$. At position 5 finger $f^8$ is connected to finger $f^9$ by means of contacts 20 and 21, and this causes the mid-field connection of the first group of motors to be connected to the trolley end of the second group of motors, while finger $f^{12}$ is connected by contacts 25 and 23 with fingers $f^{10}$, which connects the mid-field of the second group of motors with the ground side of the first set of motors, thus placing the half-fields of the different motors in parallel. Positions 4' and 4² are simply transitory positions, which first short-circuit and cut out one half-field in order to connect it in parallel with the other half-field. Position 6, which is the next running position, short-circuits half of the field of each motor, thereby still further reducing the resistance of the circuit and the counter electromotive force of the motors. This short circuit is effected by the contacts 24 and 25, which at position 6 connect together fingers $f^{11}$ and $f^{12}$, which fingers are connected to the mid-field connections $k$ and $k'$. The transitory position 5', just before reaching position 6, differs only in that the connection is still established between the trolley side of the half-fields of a second group of motors and the trolley side of the half-fields of the first group of motors. The position 5' could as well be a running position as position 6; but I arrange the notches of the step-by-step device, which all such controllers have, so as to make the running position at 6 rather than at 5, because the break at this point is one that it is very important should be certainly made. Thus if the change were made from position 5 to position 7 as quickly as possible there might be some danger of arcs being momentarily maintained between contacts 21 and 28 and between contacts 20 and 24 and their respective fingers. Under these circumstances there would be a circuit through the arcs and contacts directly between the trolley which is connected to contact 28 and ground, which is connected to finger $f^{10}$ through fingers $f^3$ and contacts 11 and 10. By running at position 6 rather than at position 5 I make it certain that the arc between finger $f^8$ and contact 20 will be eliminated before the controller is moved to position 7, and therefore I remove any possibility of this dangerous short circuit between trolley and ground through nothing but the resistance of arcs occurring. At position 7, as indicated in Fig. 6, the current first passes through the half-fields of the motors of the second group, then it passes in parallel through the remaining coils of said motors and through the armatures and half-fields of the first group of motors, and then passes through the remaining half-fields of the second set of motors, this being accomplished because the current entering the controller at $f^{15}$ passes contact 28 and thence by the cut-out switch and reversing-switch to the terminals of field-coils K²ª and K⁴ᵇ. After passing through these two coils to the mid connection $k'$ it of course passes through the remaining coils of these motors in the usual manner and also passes from the mid connection $k'$ to finger $f^{12}$, contacts 26 and 27, fingers $f^{13}$ and $f^{14}$, through the cut-out reversing-switch to the armatures M' and M³, from which it passes in the ordinary manner to the mid connection $k$ of these motors, which is connected by fingers $f^8$, contacts 17 and 16, and finger $f^6$ with the armatures of the other two motors, the field-terminals of the first set of motors being connected to ground by fingers $f^3$ and contacts 11 and 10 and finger $f^2$. It is unnecessary to consider in detail 6' to 6⁵, inclusive, as they are merely transitory positions most convenient for changing the circuit from position 6 to position 7 without troublesome sparking or inductive effects upon the motors. At position 8 the motors are connected in full parallel.

It will be noted that while I have numerous speed-stops, and therefore uniformly graduated acceleration, and a number of changes are made in the circuit relations, yet at no step is any considerable change made and there is no complexity of circuits. It will also be noted that at no step, whether transitory or running, is found a condition in which an armature has not a local closed circuit containing a resistance less than that of the two half-fields in series, so that the condition of the circuit is always a comparatively stable one, there being no tendency to what is known as "bucking" when the motor acts temporarily as a generator to produce current in a local circuit. Moreover, and what is perhaps more important, in none of the positions is any armature in a local circuit when it has not a substantial strength of field, so that if there be any tendency to generation of local current there will be no substantial sparking. It will also be noted that when the motors are in series the trolley makes connection to the first group of motors at their armature-terminals, while the connection between the ground and the second group of motors is also at the armature-terminals. In this way the fields of all the motors are together in the central portion of the circuit, so that the series parallel changes of the half-fields are made without at any time disconnecting the field of a motor from its armature. Moreover, by coupling the half-fields, as described above, I also have, no matter what the circuit position, half of the field remaining in the active circuit in series with its own armature receiving the full current thereof.

Referring now to the blow-out magnet, of which I have already given some general description, the vertical bar $h$ is fastened in any suitable manner to the back of the controller-case and is preferably insulated therefrom, as at $h^4$. Secured by suitable screws $i$ or otherwise to this vertical shaft are a series of horizontal iron bars $h'$, the ends of which, as indicated in Fig. 1, extend between the fingers of the controlling-switch at a point just above or below where the fingers break contact with the segments of the drum. Surrounding the rear end of these transverse bars are the coils $h^2$, which coils are oppositely wound on adjacent bars, so as to produce at the ends of the bars alternately north and south poles. It will thus be seen that there is a distinct and separate magnetic circuit for each of the various points of arcing, which magnetic circuit passes upward or downward from one pole to the neighboring pole, crossing in its passage the arc to be disrupted and completing its circuit through the iron of the vertical bar $h$. The result of this arrangement is that almost all of the magnetic flux produced is effective for the disrupting action, and in this my blow-out differs widely from those which have ordinarily been used, since such blow-outs have produced a magnetic flux practically threading all parts of the controller and merely somewhat concentrated at the paths across the arcs. Moreover, this arrangement of blow-out is especially effective in that it passes vertically. As the fingers are arranged in a vertical row, the passage of the magnetic flux vertically is extremely advantageous, since it will thus tend to blow the arc laterally and not have the slightest tendency to blow the arc from one finger to another. In order to protect the pole-pieces from the arcs, and therefore to insure a more perfect disruption of the same, I employ insulating septa $h^3$ to cover said poles. These septa are shaped to conform at their ends to the conformation of the drum, and thereby separate the contact-segments of the drum at the points of arcing. These septa are slotted, as indicated at $s$. These slots embrace the poles of the arms $h'$, so that each of the poles supports one of the insulating septa. In order to further support the septa in position, each septum when in position is engaged by the spring-clips $s'$. (See especially Fig. 3.) By this means the ordinary insulating septa are provided and the pole-pieces are protected in the ordinary manner; but each septum is individually removable, so as to allow free inspection and repair of the contact-fingers and other parts, and by this arrangement I dispense with the necessity of any mechanism to carry all the septa and allow the removal thereof.

It is obvious that my invention as above described is made up of a number of features which, while I prefer to use them together, may be with advantage used separately and which I desire to cover by this patent whether used together or not. It is also evident that I have shown and described a complete controller and have included therein many details which are immaterial to my invention, but which are described in order that one specific embodiment may be fully shown. I do not, therefore, wish to be limited to such specific features of construction or arrangement, as the specific embodiment I have shown may be modified in many ways without departing from the scope of my invention.

Having thus described my invention, what I claim, and desire to protect by Letters Patent, is—

1. In a motor-circuit having a plurality of motors and a circuit-controlling device, leads from the armatures and fields of said motors respectively to said device, and circuit connections controlled by said device for varying the proportions of each field in the operating-circuit and for varying the connections of the half-fields to each other.

2. In a motor-circuit having a plurality of motors and a circuit-controlling device, positive leads, negative leads, and intermediate leads, from the fields of said motors to said device, and circuit connections controlled by said device for including varying proportions of each field in balanced paralleled circuits, while maintaining the entire winding of both fields in circuit.

3. In a motor-circuit having a plurality of motors and a circuit-controlling device, leads from the armatures and fields of said motors respectively, a plurality from each field, and circuit connections controlled by said device for producing balanced parallel circuits of portions of the two fields or of producing balanced parallel circuits of the two armatures with portions only of their respective fields.

4. In a motor-circuit having a plurality of motors, connections intermediate said motors and a controlling device to shift the same from series to parallel, each armature being always connected to the corresponding field, and that armature and half of its field being always used as one element in all combinations, substantially as described.

5. In a motor-circuit having a circuit-controlling device and a plurality of electric motors divided into two groups, means, actuated by operation of said device, first, to connect a common terminal of the field of one group to a common terminal of the field of the other group, the mid-fields of either group being connected to common leads, while the armatures of one group are attached by a common terminal to the source of current and the armatures of the other group are attached by a common terminal to the ground; second, to connect in overlapped or parallel relation the groups of half-fields which lie between the mid-field connection and the common field-terminal; third, to cut out these groups of half-fields leaving the motors in series but each armature running in series with the half-field that lies between it and the mid-field connection; fourth, to put the aforesaid groups of half-fields again in series but lapping over or paralleling the groups of armatures and half-fields that lie between the common armature connection and the mid-field connection; and finally to connect the two groups of motors in parallel.

6. In a motor-circuit having a plurality of electric motors and a circuit-controlling device, means acting on operation of said device to connect said motors in various series and parallel relations for various speeds, each armature being throughout all the combinations connected to its own field, and each motor being connected to the controlling-switch by three leads, one of them being a terminal armature-lead, another being a terminal field-lead, and another being an intermediate lead, so connected as to leave on all combinations each armature connected in series with a section of its own field sufficient to force an approximately equal division of the current between the armatures when connected in parallel with each other.

7. In a motor-circuit having a plurality of motors and a circuit-controlling device to shift said motors from the series to the parallel relation, means acting on the last series position of said device to leave entirely disconnected from the circuit those terminals of said motors which on the first parallel position are to be connected to source of current and ground respectively.

8. The combination of two motors and a controller therefor having contacts and connections arranged to place the two motors in series with each other with one element of one motor at one side of the motor-circuit, the like element of the other motor at the other side of the motor-circuit, and the remaining elements of the motors connected together and each connected to one of the first-mentioned elements, and having contacts and connections arranged to shift the motors to parallel by intermediate positions in which one motor is connected to a point intermediate of the terminals of the other motor, without at any time during the shift separating the elements in an individual motor.

9. The combination of two series electric motors and a controller therefor having contacts and connections arranged to place the two motors in series, each with its field connected directly to its own armature but with the fields and armatures reversed relatively to each other as to their position in the circuit, and having contacts and connections arranged to shift the motors by successive steps in which one motor is connected to points intermediate of the terminals of the other motor until the two motors are in parallel with each other.

10. The combination of two series electric motors of a controller having contacts and connections arranged to place the two motors in series, the connection between the two motors being from an element of one motor to a like element of the other, and in parallel, and intermediate thereto to connect the terminal of one element of one motor with a point on the unlike element of the other motor intermediate the terminals of said element.

11. The combination with two series electric motors of a controlling-switch having contacts and connections arranged to place the two motors in series, the connection between the two motors being from an element of one motor to a like element of the other motor, and in parallel, and intermediate thereto to make successive changes of relation of the coils of the different motors relative to each other.

12. The combination with two series electric motors of a controlling-switch having contacts and connections arranged to place the two motors in series, the connection between the two motors being from an element of one motor to a like element of the other motor, and in parallel, and intermediate thereto to make successive changes of the coils of the different motors relative to each other, and a reversing-switch connecting the fields of each motor to the armature thereof.

13. The combination with two series electric motors of a controller having contacts and connections arranged to connect the two motors in series and in parallel with each other and intermediate thereto to obtain intermediate circuit conditions by varying the connections in the circuit of one-half the field-winding of the two motors relative to each other.

14. The combination with two series electric motors of a controller having contacts and connections arranged to connect the two motors in series and in parallel with each other and intermediate thereto to connect one-half of one field-winding in parallel with one-half of the other field-winding, the remaining coils of the two motors remaining in series with each other.

15. The combination with two series electric motors of a controller having contacts and connections arranged to connect the two motors in series and in parallel with each other and intermediate thereto to connect half of the field-winding of one motor in series with one-half the field-winding of the other motor, the remaining coils of the different motors being in parallel with each other.

16. The combination with two series electric motors of a controller having contacts and connections arranged to connect the two motors in series and in parallel with each other and intermediate thereto to obtain intermediate circuit conditions by making series parallel combinations of one-half of the field-winding of each motor and of the remaining coils of said motors.

17. The combination with two series electric motors of a controller having contacts and connections arranged to connect the two motors in series and in parallel with each other and intermediate thereto to obtain intermediate circuit conditions by making series parallel combinations of one-half of the field-winding of each motor and of the remaining coils of said motors and by short-circuiting or cutting out said half field-winding.

18. The combination with two series electric motors of a controller therefor having contacts as $f^8$ and $f^{12}$ connected to a central point in the field-windings of said motors, other contacts as $f^9$ and $f^{10}$ connected to the field-terminals of the two motors, and contacts as 20, 21, 23 and 25, adapted to connect such centrally-connected contacts to the terminal contact of the other field.

19. The combination with two series electric motors of a controller therefor having contacts as $f^8$ and $f^{12}$ connected to a central point in the field-windings of said motors, other contacts as $f^6$ and $f^{13}$ connected to the armature-terminals of the two motors, and movable contacts adapted to connect each centrally-connected contact to the armature-contact of the other motor.

20. The combination with two series electric motors of a controller therefor having fixed contacts connected to central points in the field-windings of the two motors, and other fixed contacts connected to terminals of the two motors, and movable contacts adapted to connect the centrally-connected contact of each motor with the terminal-contact of the other motor.

21. The combination with two series electric motors of a controller therefor having fixed contacts connected to central points in the field-windings of the two motors, others connected to the field-terminals of the two motors, and others connected to the armature-terminals of the two motors, of movable contacts for connecting each centrally-connected contact to either the field-terminal contacts or to the armature-terminal contact of the other motor.

22. The combination with two series electric motors of a controller therefor having fixed contacts connected to central points in the field-windings of the two motors, others connected to the field-terminals of the two motors, and others connected to the armature-terminals of the two motors, of movable contacts for connecting each centrally-connected contact to either the field-terminal contacts or the armature-terminal contact of the other motor or for connecting the centrally-connected contacts to each other.

23. The combination of two pairs of series electric motors, a connection extending from a point intermediate the field-terminals of one motor of each pair to a like point on the other motor of its pair, and a controller for said motors having contacts and connections arranged to place the two pairs of motors in series and parallel relation with each other and intermediate thereto to obtain additional speed regulation by shifting the connection in the circuit of said intermediate field connections.

24. The combination of two pairs of series electric motors, a speed-controlling switch, three connections between the motors of each of said pairs made independently of said speed-controlling switch, fixed contacts of the controlling-switch connected to the said six connections, and movable contacts on the said controlling-switch arranged to make various circuit combinations of said six connections.

25. The combination of two pairs of series electric motors, a controlling-switch, a reversing-switch, permanent connections between one terminal of the motors of each of said pairs, a permanent connection between the motors of each of said pairs at points intermediate the field-terminals of the motors, a connection between the other terminal of the motors of each of said pairs made through the reversing-switch, fixed contacts of the controlling-switch connected to each of the foregoing six connections, and movable contacts of said controlling-switch arranged to connect said fixed contacts together in different ways.

26. In an electric controller, a vertical magnetizable member, a series of horizontal magnetizable members secured thereto and projecting between the contact-fingers of the controller, and an energizing-coil surrounding the base of each of said horizontal members.

27. In an electric controller, a vertical magnetizable member, a series of horizontal magnetizable members secured thereto and projecting between the contact-fingers of the controller, and an energizing-coil surrounding the base of each of said horizontal members, successive energizing-coils being oppositely wound.

28. In an electric controller, a vertical magnetizable member, a series of horizontal magnetizable members secured thereto and projecting between the contact-fingers of the controller, and an energizing-coil surrounding the base of each of said horizontal members, and an insulating-shield carried by said horizontal members and inclosing the poles thereof.

29. In an electric controller, a vertical magnetizable member, a series of horizontal magnetizable members secured thereto and projecting between the contact-fingers of the controller, an energizing-coil surrounding the base of each of said horizontal members, and a series of insulating-shields having slots receiving the ends of said horizontal members.

30. In an electric controller, a vertical magnetizable member, a series of horizontal magnetizable members secured thereto and projecting between the contact-fingers of the controller, and an energizing-coil surrounding the base of each of said horizontal members, and a series of insulating-shields having slots receiving the ends of said horizontal members, said insulating-shields being separately removable from said members.

31. In an electric controller, a series of contact-fingers, a series of members projecting one between each pair of adjacent contacts and a series of insulating septa having slots loosely engaging said projecting members.

32. In an electric controller, a series of contact-fingers, a series of insulating septa, means for independently supporting the same, one between each adjacent pair of contact-fingers, and a spring-clip between each adjacent pair of contact-fingers engaging the said insulating septa.

33. In an electric controller, the contact-fingers thereof, a magnet-pole extending between each adjacent pair of fingers, an insulating septum having a slot loosely engaging each magnet-pole and supported thereby, and a spring-clip engaging each insulating septum.

34. The combination with two electric motors, a series parallel controlling-switch therefor, fixed contacts of said switch, movable contacts of said switch directly connecting the said fixed contacts at a series position of the switch, other movable contacts on said switch directly connecting some of said fixed contacts with trolley and ground at a parallel position of said switch, and a step-by-step device for such switch arranged so that a step is provided at a point after the fixed contacts have become disengaged from the first-mentioned group of movable contacts.

35. The combination with two electric motors, a series parallel controlling-switch therefor, fixed contacts thereof, as $f^9$ and $f^{10}$ connected together in a series position and to trolley and ground respectively in a parallel position, an intermediate position of said switch in which said fingers are neither connected together nor to trolley or ground, and a step-by-step device for said controller having one of its steps at said intermediate position.

Signed at Pittsfield, Massachusetts, this 1st day of June, 1903.

SAMUEL T. DODD.

Witnesses:
  L. S. HAWKINS,
  R. E. HAYNES.